United States Patent [19]

Barr, Jr. et al.

[11] 3,858,168

[45] Dec. 31, 1974

[54] METHOD OF FILTERING MULTI-COMPONENT SEISMIC DATA

[75] Inventors: Frederick J. Barr, Jr.; Clifford H. Ray, both of San Antonio, Tex.

[73] Assignee: Petty-Ray Geophysical, Inc., Houston, Tex.

[22] Filed: Sept. 13, 1972

[21] Appl. No.: 288,686

[52] U.S. Cl. .................. 340/15.5 CP, 340/15.5 F, 340/15.5 SW
[51] Int. Cl. ............................................. G01v 1/28
[58] Field of Search. 340/15.5 F, 15.5 DP, 15.5 CP, 340/15.5 MC; 444/1 MC

[56] References Cited
UNITED STATES PATENTS
3,550,073  12/1970  Foster et al ................ 340/15.5 MC
3,736,556  5/1973  Barr ........................... 340/15.5 CP OTHER PUBLICATIONS
Seismic Signal Enhancement with Three Component Detectors, Shimshoni et al., Geophysics, Vol. 29, No. 5, pp. 664–671.
Principles of Digital Filtering, Robinson et al., "Geophysics," XXIX, No. 3, June 64, pp. 395–404.
Seismic Noise Estimation Using Horizontal Components, Potter et al., "Geophysics," Vol. XXXII, Aug. 67, pp. 617–632.
Seismic Signal Enhancement with Three Component Detectors, "Geophysics," Vol. XXIX, No. 5, Oct. 64, pp. 664–671.

*Primary Examiner*—Maynard R. Wilbur
*Assistant Examiner*—H. A. Birmiel

[57] ABSTRACT

In seismic surveying by the seismic reflection technique, a method is provided for severely attenuating undesired ground-wave noise while not significantly attenuating the desired seismic signals. Horizontally and vertically oriented geophones are employed, the output of each being passed through one channel of a specially designed linear two-channel digital filter. The channel outputs are summed to produce a signal in which the ground-wave signal is severely attenuated. The filter may be designed by linear programming or Fourier transform frequency-domain techniques.

4 Claims, 6 Drawing Figures 3,858,168

METHOD OF FILTERING MULTI-COMPONENT SEISMIC DATA

FIELD OF THE INVENTION

The present invention relates generally to seismic surveying and more particularly to a method of gathering and processing seismic data whereby surface noise is significantly attenuated while the desired compressional signals are not.

BACKGROUND OF THE INVENTION

In the field of seismic exploration on land, using the seismic reflection technique, it is well known that the most severe source of noise is usually that which travels along the surface of the ground. This surface noise manifests itself in the form of Rayleigh waves. Various methods have been proposed for eliminating, as much as possible, the effects of such ground-roll waves when investigating subsurface formations. For example, in the patent to Owen, U.S. Pat. No. 2,215,297, issued Sept. 17, 1940, the effects of ground-roll waves are to some extent eliminated by a relatively simple phase-shifting technique, utilizing LR filtration.

It is a feature of our invention to provide a new, improved, and totally different method of eliminating the effects of surface noise in the processing of seismic signals.

It is another feature of our invention to provide a method of surface-noise attenuation which introduces no appreciable distortion into the processed signals.

It is a further feature of our invention to provide a method of attenuating seismic surface noise, which method can be implemented in several convenient alternative schemes which, when once understood, will be easily and expeditiously carried out by persons skilled in the art.

Further features and advantages of our invention will be apparent to persons skilled in the art from consideration of this specification, including the claims and the drawings.

SUMMARY OF THE INVENTION

Our invention contemplates, initially, the simultaneous reception of separate horizontal and vertical components of wave energy at a reception point on or near the surface of the earth, such wave energy having been generated by a conventional energy source at a shot point at a different location, either on, above or below the surface of the earth. Apparatus for accomplishing such horizontal and vertical reception is disclosed in co-pending application Ser. No. 178,654, filed Sept. 8, 1971, by Frederick J. Barr, Jr. The received waves are then digitally sampled. The digital signals are then passed through a specially designed two-channel linear digital filter. The coefficients of this digital filter must be selected in the manner to be described herein. The filter coefficients can, by our teaching, be calculated with the aid of a general-purpose digital computer. They can also be calculated by hand for the Fourier transform design technique herein disclosed. Once determined, these coefficients may be used as settings on a suitable commercially available digital filter, or, alternatively, programmed into a digital computer which will then be capable of carrying out our method. Thus, the method of our invention is not per se a computer program, but one may utilize a computer for calculating the necessary filter coefficients and, optionally, for implementation of our invention.

DETAILED DESCRIPTION OF THE INVENTION

Figure 2:
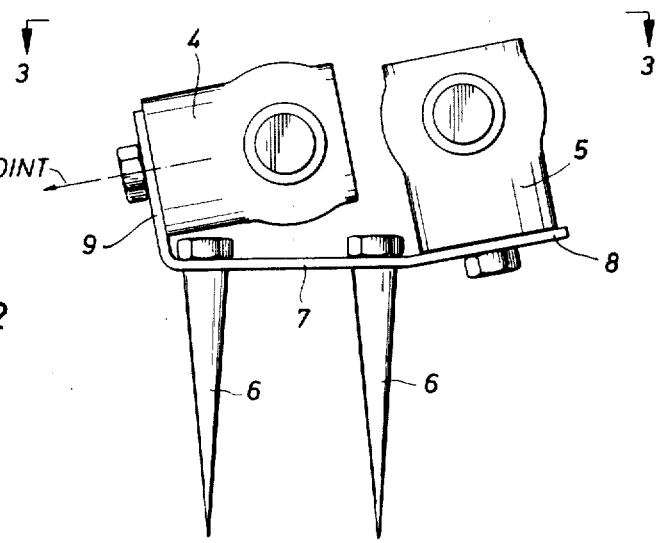
FIG. 2 is a side view of a two-dimensional geophone.

Referring now to FIG. 2 of the drawings, a horizontal geophone 4 and a vertical geophone 5 are shown. These may be suitable commercially available geophones, such as matched horizontal and vertical units, Model GSC-11D, available from GeoSpace Corporation, Houston, Texas, may be employed. It is desirable that the geophones used be, as nearly as possible, a matched pair.

The geophones 4 and 5 are mounted on a platform comprising three sections 7, 8 and 9. Section 7, the center section, is horizontal and is designed for the ready fastening thereto of support spikes 6, in the conventional manner well known to persons skilled in the art. It is beneficial, in the practice of our invention, to cant section 8 of the platform by a small angle to the horizontal plane, for example ten degrees, and to cant section 9 by the same angle to the vertical plane, so that the axes of principal sensitivity of geophones 4 and 5 are maintained perpendicular to each other. An imaginary extension of the axis of principal sensitivity of geophone 4 should include a shotpoint from which seismic waves originate, as indicated in FIG. 2.

Figure 1:
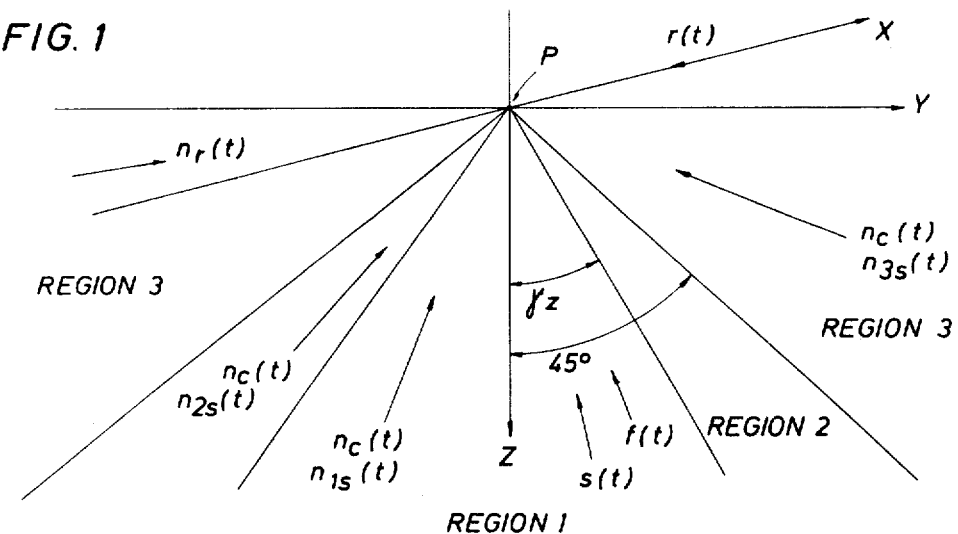
FIG. 1 is a representation of various signals arriving at a detection point P from a shot point along the X axis.
Figure 3:
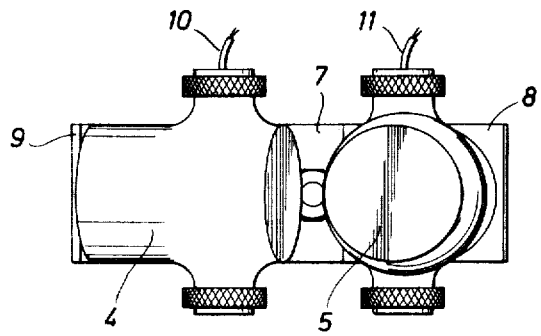
FIG. 3 is a top view of the same two-dimensional geophone.

As shown in FIG. 3, leads 10 and 11 extend from the horizontal and vertical geophones 4 and 5, respectively, to conduct the output signals thereof for processing in accordance with the invention. The assembly of FIGS. 2 and 3 is placed on the surface of the earth. For practical application purposes, it may be assumed that the geophones 4 and 5 are located at a single point. As set forth in the previously mentioned application, Ser. No. 178,654, the vertical and horizontal geophone output signals, resulting from the arrival at the location of the geophones of the previously mentioned waves, may be expressed using the following notation, referring now to FIG. 1:

$f(t)$ = the desired compression wave signals;
$s(t)$ = vertical shear wave from region 1;
$n_c(t)$ = compression wave noise;
$n_{1s}(t)$ = vertical shear wave noise from region 1;
$n_{2s}(t)$ = vertical shear wave noise from region 2;
$n_{3s}(t)$ = vertical shear wave noise from region 3;
$r(t)$ and $n_r(t)$ = Rayleigh wave noise arriving at point P.

Referring now to FIG. 3, the signals appearing on conductors 10 and 11 are $V_x(t)$ and $V_z(t)$, respectively. The components of these signals are given by the following expressions:

$$V_x(t) = A(\gamma_z) \cos \theta_c(t) f(t) + F_1(\gamma_z) \cos \theta_s(t) s(t)$$

$$+ H \cos \theta_r(t) \left\{ r(t) \right\}_{\pi/2} + \int_{\theta=-\pi}^{\pi} \cos \theta(t)$$

$$[A(\gamma_z) n_c (\theta, t) + F_1(\gamma_z) n_{1s} (\theta, t) + F_2(\gamma_z) n_{2s}(\theta, t)$$
$$- F_2(\gamma_z) n_{3s}(\theta, t) + H \{n_r(\theta, t)\}_{\pi/2}] d\theta$$

and $$V_z(t) = B(\gamma_z) f(t) - G_1(\gamma_z) s(t) + r(t)$$

$$+ \int_{\theta=-\pi}^{\pi} [B(\gamma_z) n_c(\theta, t) - G_1(\gamma_z) n_{1s}(\theta, t)$$

$$- G_2(\gamma_z) \{n_{2s}(\theta, t)\}_{\pi/2} - G_2(\gamma_z) \{n_{3s}(\theta, t)\}_{\pi/2}$$
$$+ n_r(\theta, t)] d\theta$$

where $\gamma_z$ = angle of approach of respective waves, measured from the Z axis, in radians;

$\alpha$ = velocity of propagation of compression waves in the earth $\beta$ = velocity of propagation of shear waves in the earth where $A = 4\sin \gamma_z \cos \theta_z (\beta/\alpha)[1 - (\beta/\alpha)^2 \sin^2\gamma_z]^{1/2}/D$
$B = 2\cos \gamma_z [1 - 2(\beta/\alpha)^2 \sin^2\gamma_z]/D$
$D = [1 - 2(\beta/\alpha)^2 \sin^2\gamma_z]^2 + 4(\beta/\alpha)^3 \sin^2\gamma_z$
$F_1 = 2\cos \gamma_z (1 - 2\sin^2\gamma_z)/E$
$G_1 = 4\sin \gamma_z \cos \gamma_z [(\beta/\alpha)^2 - \sin^2\gamma_z]^{1/2}/E$
$E = (1 - 2\sin^2\gamma_z)^2 + 4\sin^2\gamma_z \cos \gamma_z [(\beta/\alpha)^2 - \sin^2\gamma_z]^{1/2}$
$F_2 = 2\cos \gamma_z (1 - 2\sin^2\gamma_z)/E_1$
$G_2 = 4\sin \gamma_z \cos \gamma_z [\sin^2\gamma_z - (\beta/\alpha)^2]/E_1$
$E_1 = [(1 - 2\sin^2\gamma_z)^4 + 16\sin^4\gamma_z \cos^2\gamma_z (\sin^2\gamma_z - (\beta/\alpha)^2)]^{1/2}$
$H = 2 - (c_r/\beta)^2 - 2[1 - (c_r/\beta)^2]^{1/2} [1 - (c_r/\alpha)^2]^{1/2}/(c_r/\beta)^2 [1 - (c_r/\alpha)^2]^{1/2}$ $c_r$ = velocity of a Rayleigh wave across the surface of the earth, in ft./sec.

$\theta$ = angle of approach of respective waves, measured from the $x$ axis, in radians $\{f(t)\}_{\pi/2}$ = a function of time having all its frequency components shifted by ninety degrees with respect to those of $f(t)$.

It will be observed from the above expressions that each frequency component of the Rayleigh wave noise, $r(t)$, recorded from the vertical detector is 90° ($\pi/2$ radians) out of phase with the corresponding frequency component of the same noise recorded from the horizontal detector. However, the frequency components of the two recorded signals, $V_x(t)$ and $V_z(t)$, are in phase in the presence of desired signal, $f(t)$.

Figure 4:
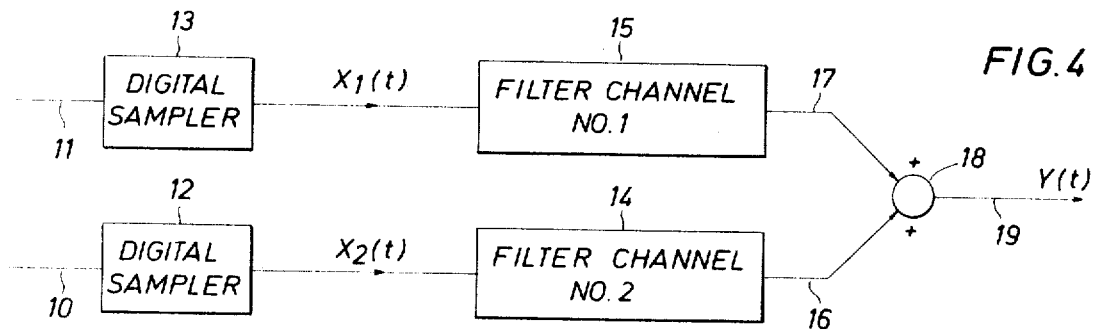
FIG. 4 is a general functional representation of the two-channel filter employed in the method of our invention, showing input and output signals as functions of time.

The method of our invention involves the design and application of a linear two-channel filter, as shown in FIG. 4. The signals from the vertical geophone $V_z(t)$ and the horizontal geophone $V_x(t)$ are first routinely digitally sampled by standard samplers 12 and 13 to produce the signals $X_1(t)$ and $X_2(t)$ respectively, as shown in FIG. 4. Of course, if, as is the usual case, the data are digitally recorded in the field, no separate sampling apparatus will be required to produce the signals $X_1(t)$ and $X_2(t)$. It should also be understood that the geophone signals can be treated with AGC (automatic gain control) prior to filtering and may be recorded prior to filtering.

The successful attenuation of the surface noise in the method of our invention is dependent upon the amplitudes of $X_1(t)$ and $X_2(t)$ being very nearly equal in the presence of the surface noise. This is fairly easy to accomplish, since the surface noise generally dominates both of these signals when it is present, due to its tremendous amplitude compared to the desired signal. Accordingly, prior to feeding the signals $X_1(t)$ and $X_2(t)$ through the filters 14 and 15, a simple conventional scaler (not shown) should be employed to one or both of the signals $X_1(t)$ and $X_2(t)$ to equalize their RMS values for the period of time when the surface noise is present.

Figure 6:
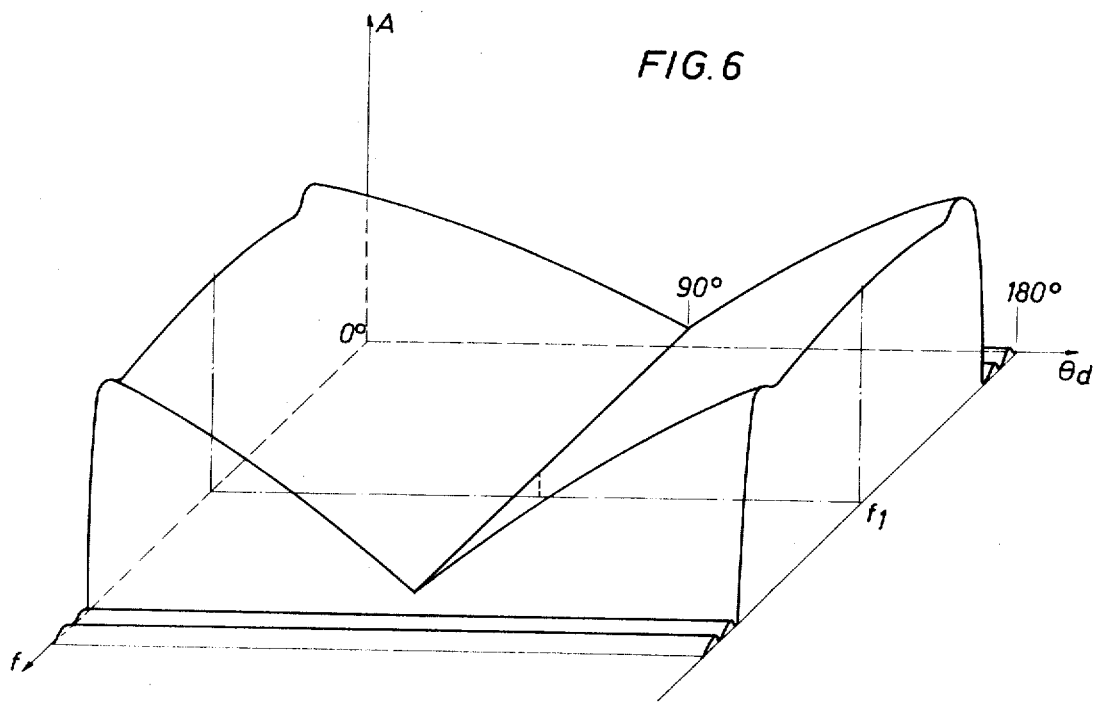
FIG. 6 is a graphical representation of the two-channel filter's transfer function, plotting amplitude against frequency and phase difference.

In the method of our invention we then implement the observation concerning phase relationships, as above stated, to attenuate noise but not to attenuate the desired signal. This we do by designing the two-channel filter shown in FIG. 4 and represented in the frequency domain in the three-dimensional plot of FIG. 6. FIG. 6 is a plot of amplitude versus frequency $(f)$ versus phase difference $(\theta_d)$ between the frequency components entering filter channel No. 1 (the sampled vertical geophone signal), and the corresponding frequency components entering filter channel No. 2 (the horizontal geophone signal).

Referring in more detail to FIG. 6, this transfer function is seen to severely attenuate the amplitude of all frequency components when the phase difference between them, $\theta_d$, is 90°. Conversely, there is little or no attenuation when their phase difference is 0° or 180°. For example, referring to FIGS. 4 and 6, if the frequency component $f_1$ is present on both filter channels and the sinusoid on one channel is $\theta_d$ degrees out of phase with that on the other channel, the output of the two-channel filter would be much larger if $\theta_d$ were 0° or 180° than if $\theta_d$ were 90°. Since, as we have stated above, the horizontal and vertical geophone signals will have frequency components 90° out of phase in the presence of noise, a two-channel filter functioning as above described and as illustrated in FIGS. 4 and 6 will significantly attenuate such noise. We turn now to the question of how to design such a filter.

The preferred method of designing the two-channel filter described above is by linear programming. For this design technique, we refer to FIG. 5, in which the filter output, represented in the frequency domain, is given by the following equation:

$$Y(f) = H_1(f) \cdot X_1(f) + H_2(f) \cdot X_2(f) \qquad 1.$$

where $X_1(f)$ and $X_2(f)$ (FIG. 5) are the inputs to filter channel No. 1 and filter channel No. 2, respectively, represented in the frequency domain. $Y(f)$ is the frequency domain representation of the output. $H_1(f)$ and $H_2(f)$ are the individual channel No. 1 and channel No. 2 transfer functions. It is assumed that the impulse responses of the filters are finite in length and sampled with a uniform sample interval of T seconds. The frequency-domain representations of $H_1(f)$ and $H_2(f)$ in terms of their time domain filter coefficients $a_i$ and $b_i$, respectively, are then given in standard notation by the following equations:

$$H_1(f) = a_{-N} \epsilon^{+j2\pi \, NT} + a_{-N+1} \epsilon^{+j2\pi \, (N-1)T} + \ldots + a_0 \epsilon^{j0} + a_1 \epsilon^{-j2\pi \, T} + a_2 \epsilon^{-j2\pi \, 2T} + \ldots + a_N \epsilon^{-j2\pi \, NT} \qquad 2.$$

and $$H_2(f) = b_{-N} \epsilon^{+j2\pi \, NT} + b_{-N+1} \epsilon^{+j2\pi \, (N-1)T} + \ldots + b_0 \epsilon^{j0} + b_1 \epsilon^{-j2\pi \, T} + b_2 \epsilon^{-j2\pi \, 2T} + \ldots + b_N \epsilon^{-j2\pi \, NT} \qquad 3.$$

where T is the sample interval and $2N+1$ is the number of coefficients in each filter.

The relationship of the two inputs $X_1(f)$ and $X_2(f)$ is given by $$X_2(f) = X_1(f)e^{j\theta_d} \quad 4.$$

where $\theta_d$ will be assigned values of 0° and 90°. It is desired that the two-channel filter output be equal to $X_1(f)$ when $\theta_d = 0°$ and be equal to 0 when $\theta_d = 90°$. Combining equations (1) and (4), the output may be represented by $$Y(f) = [H_1(f) + H_2(f)e^{j\theta_d}] X_1(f) \quad 5.$$

Here it is required that the term in the brackets $$[H_1(f) + H_2(f)e^{j\theta_d}]$$

be close to unity for $\theta_d = 0°$ for a given specified set of frequencies and be close to 0 for $\theta_d = 90°$ for the same set of frequencies. Mathematically, we desire the following set of inequalities to be satisfied with $\epsilon$ as small as possible for each of the specified frequencies $f_1, f_2, f_3, \ldots, f_M$:

$$|Re [H_1(fi) + H_2(fi)e^{j0°}] - 1| \leq \epsilon |Im [H_1(fi) + H_2(fi)e^{j0°}] - 0| \leq \epsilon |Re [H_1(fi) + H_2(fi)e^{j90°}] - 0| \leq \epsilon |Im [H_1(fi) + H_2(fi)e^{j90°}] - 0| \leq \epsilon$$

$$i = 1, 2, \ldots, M \quad 6.$$

Substituting equations (2) and (3) into equations (6), the inequalities of equations (6) may be formulated into the Dual problem of linear programming as mentioned on page 83 of the text *Linear Programming*, by Saul I. Gass, Second Edition, McGraw-Hill (1964). This formulation is as follows:

MAXIMIZE: $\epsilon$

SUBJECT TO:

$a_{-n}\cos 2\pi fiNT + a_{-n+1} \cos 2\pi fi (N-1)T + \ldots + a_0 + a_1\cos 2\pi fi T + \ldots + a_n \cos 2\pi fiNT + b_{-n}\cos 2\pi fiNT + b_{-n+1} \cos 2\pi fi (N-1)T + \ldots + b_0 + b_1\cos 2\pi fi T + \ldots + b_n \cos 2\pi fiNT - \epsilon \leq 1 \quad 7.$ $- a_{-n}\cos 2\pi fiNT - a_{-n+1} \cos 2\pi fi (N-1)T - \ldots - a_0 - a_1\cos 2\pi fi T - \ldots - a_n \cos 2\pi fiNT - b_{-n}\cos 2\pi fi T - b_{-n+1} \cos 2\pi fi (N-1)T - \ldots - b_0 - b_1\cos 2\pi fi T - \ldots - b_n \cos 2\pi fiNT - \epsilon \leq -1 \quad 7.$ $a_{-n}\sin 2\pi fiNT + a_{-n+1} \sin 2\pi fi (N-1)T + \ldots + 0 - a_1\sin 2\pi fi T - \ldots - a_n \sin 2\pi fiNT + b_{-n}\sin 2\pi fiNT + b_{-n+1} \sin 2\pi fi (N-1)T + \ldots + 0 - b_1\sin 2\pi fi T - \ldots - b_n \sin 2\pi fiNT - \epsilon \leq 0 \quad 7.$ $- a_{-n}\sin 2\pi fiNT - a_{-n+1} \sin 2\pi fi (N-1)T - \ldots - 0 + a_1\sin 2\pi fi T + \ldots + a_n \sin 2\pi fiNT - b_{-n}\sin 2\pi fiNT - b_{-n+1} \sin 2\pi fi (N-1)T - \ldots - 0 + b_1\sin 2\pi fi T + \ldots + b_n \sin 2\pi fiNT - \epsilon \leq 0 \quad 7.$ $a_{-n}\cos 2\pi fiNT + a_{-n+1} \cos 2\pi fi (N-1)T + \ldots + a_0 + a_1\cos 2\pi fi T + \ldots + a_n \cos 2\pi fiNT + b_{-n}\cos (2\pi fiNT + \pi/2) + b_{-n+1} \cos (2\pi fi(N-1)T + \pi/2) + \ldots + 0 + b_1\cos (2\pi fi T - \pi/2) + \ldots + b_n \cos (2\pi fiNT - \pi/2) - \epsilon \leq 0 \quad 7.$ $- a_{-n}\cos 2\pi fiNT - a_{-n+1} \cos 2\pi fi (N-1)T - \ldots - a_0 - a_1\cos 2\pi fi T - \ldots - a_n \cos 2\pi fiNT - b_{-n}\cos (2\pi fiNT + \pi/2) - b_{-n+1} \cos (2\pi fi (N-1)T + \pi/2) - \ldots - 0 - b_1\cos (2\pi fi T - \pi/2) - \ldots - b_n \cos (2\pi fiNT - \pi/2) - \epsilon \leq 0 \quad 7.$ $a_{-n}\sin 2\pi fiNT + a_{-n+1} \sin 2\pi fi (N-1)T + \ldots + 0 - a_1\sin 2\pi fi T - \ldots - a_n \sin 2\pi fiNT + b_{-n} \sin (2\pi fiNT + \pi/2) + b_{-n+1} \sin (2\pi fi (N-1)T + \pi/2) + b_0 - b_1 \sin (2\pi fi T - \pi/2) - \ldots - b_n \sin (2\pi fiNT - \pi/2) - \epsilon \leq 0 \quad 7.$ $- a_{-n}\sin 2\pi fiNT - a_{-n+1} \sin 2\pi fi (N-1)T - \ldots - 0 + a_1\sin 2\pi fi T + \ldots + a_n \sin 2\pi fi T - b_{-n}\sin (2\pi fiNT + \pi/2) - b_{-n+1} \sin (2\pi fi (N-1)T + \pi/2) - \ldots - b_0$ $+ b_1 \sin (2\pi fi T - \pi/2) + \ldots + b_n \sin (2\pi fiNT - \pi/2) - \epsilon \leq 0 \quad 7.$ where $f_i$ equals $f_1, f_2, \ldots, f_M$.

The number of frequencies, M, is selected so that the number of inequalities exceeds the number of variables. Since there are eight inequalities set forth above for each specified frequency and 43 variables ($a_0$ through $a_{20}$, $b_0$ through $b_{20}$, and $\epsilon$), there must be at least six frequencies specified (six frequencies times eight inequalities for each frequency equals 48.) However, the quality of the designed filter improves with the number of frequencies specified.

To give a specific example, we chose 23 frequencies evenly spaced between 10.000000 hertz and 100.000000 hertz, which corresponds to a typical seismic band of interest. The frequencies were:

$f_1 = 10.000000$ hertz
$f_2 = 14.090909$ hertz
$f_3 = 18.181818$ hertz
$f_4 = 22.272727$ hertz
$f_5 = 26.363636$ hertz
$f_6 = 30.454545$ hertz
$f_7 = 34.545455$ hertz
$f_8 = 38.636364$ hertz
$f_9 = 42.727273$ hertz
$f_{10} = 46.818182$ hertz
$f_{11} = 50.909091$ hertz
$f_{12} = 55.000000$ hertz
$f_{13} = 59.090909$ hertz
$f_{14} = 63.181818$ hertz
$f_{15} = 67.272727$ hertz
$f_{16} = 71.363636$ hertz
$f_{17} = 75.454545$ hertz
$f_{18} = 79.545455$ hertz
$f_{19} = 83.636364$ hertz
$f_{20} = 87.727273$ hertz
$f_{21} = 91.818182$ hertz
$f_{22} = 96.909091$ hertz
$f_{23} = 100.000000$ hertz For the above set of specified frequencies, the filter coefficients, $a_0$–$a_{20}$ and $b_0$–$b_{20}$, may be calculated by solving the linear programming problem associated with the set of inequalities set forth above in equations (7). There are several computational schemes given in the literature which may be programmed on a general purpose digital computer to solve this problem. For example, a method is given in *Linear Programming* by Saul I. Gass, Second Edition, McGraw-Hill (1964), pages 96–113, called the "Revised Simplex Method." We have solved the problem for the above set of inequalities for the 23 specified frequencies above set forth, on a CDC 3200 digital computer, using a sample interval of 4 milliseconds. The filter coefficients that were calculated are:

| | |
|---|---|
| $a_0 = -.0159271$ | $b_0 = .0048477$ |
| $a_1 = -.0078510$ | $b_1 = .0072129$ |
| $a_2 = -.0179659$ | $b_2 = .0048782$ |
| $a_3 = -.0167554$ | $b_3 = .0225069$ |
| $a_4 = -.0209695$ | $b_4 = .0050956$ |
| $a_5 = -.0330714$ | $b_5 = .0463427$ |
| $a_6 = -.0244535$ | $b_6 = -.0009695$ |
| $a_7 = -.0807711$ | $b_7 = .0999461$ |
| $a_8 = -.0209420$ | $b_8 = -.0069064$ |
| $a_9 = -.3008318$ | $b_9 = .3207509$ |
| $a_{10} = .4798043$ | $b_{10} = .4891057$ |
| $a_{11} = .3283475$ | $b_{11} = -.3039051$ |
| $a_{12} = -.0146930$ | $b_{12} = -.0176098$ |
| $a_{13} = .1032186$ | $b_{13} = -.0825389$ |
| $a_{14} = -.0076540$ | $b_{14} = -.0180745$ |

-Continued

| | |
|---|---|
| $a_{15} = .0531713$ | $b_{15} = -.0354747$ |
| $a_{16} = -.0049986$ | $b_{16} = -.0189749$ |
| $a_{17} = .0263767$ | $b_{17} = -.0117793$ |
| $a_{18} = .0011240$ | $b_{18} = -.0149810$ |
| $a_{19} = .0137520$ | $b_{19} = -.0023640$ |
| $a_{20} = .0073285$ | $b_{20} = -.0195431$ |

These two-channel filter coefficients are all that is needed to define the filter to be used in practicing the method of our invention. There are at least two distinct types of apparatus which may then be employed to carry out our method. The first is a properly programmed general-purpose digital computer, such as the CDC 3200, programmed to function as a digital filter. The second is to employ two hardware digital filters, such as commercially available under the designation Rockland Programmable Digital Filter, Series 4100, which may be purchased from Rockland Systems Corp., 131 Erie Street, Blauvelt, New York, 10913.

For computer implementation, suppose we have a sampled data trace:

$d_1, d_2, d_3, d_4, d_5, \ldots, d_{NDPTS}$, where NDPTS equals the number of data points. Assume a digital filter with coefficients:

$a_1, a_2, a_3, a_4, \ldots, a_{NFPTS}$, where NFPTS is equal to the number of filter points. Storing the data points in the computer in the following manner:

$ID(1) = d_1, ID(2) = d_2, ID(3) = d_3, \ldots, ID(NDPTS) = d_{NDPTS}$;

and storing the filter points in the computer in the following manner:

$IA(1) = a_{NFPTS}, IA(2) = a_{NFPTS-1}, \ldots, IA(NFPTS) = a_1$ we can compute the response in IR in the following manner:

```
DO 1 J = 1, NDPTS + NFPTS − 1
IR(J) = 0
DO 1 I = 1, NFPTS
K = I + J − NFPTS + NFPTS/2
IF (K.LE.O.OR.K.GT.NDPTS) GO TO 1
IR(J) = IR(J) + IA(I) * ID(K)
1 CONTINUE
```

A similar program is written for the second channel.

If the filtering in the method of our invention is to be done by a hardware digital-filter device, each of the coefficients, such as those listed above for a 21-point filter, is manually set on the device.

Figure 5:
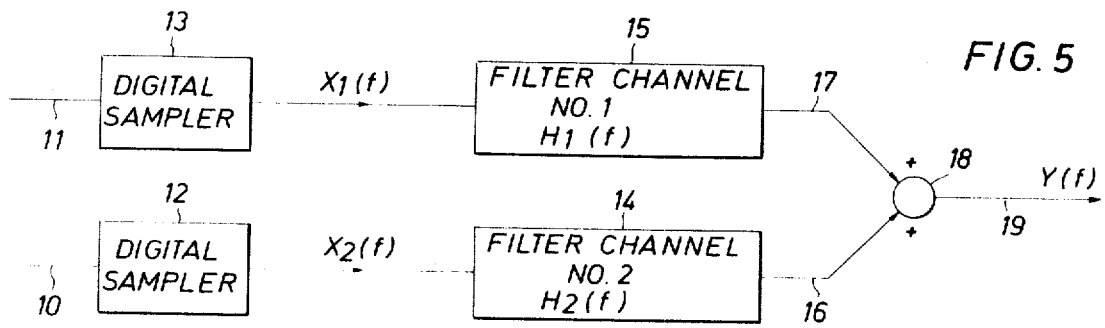
FIG. 5 is a general functional representation of the two-channel filter employed in the method of our invention, showing input and output signals as functions of frequency.

The output of filter-channel number 1 and the output of filter channel number 2 are then summed as shown in FIGS. 4 and 5 by a conventional summing circuit 18. The output signal on line 19, $Y(t)$ or $Y(f)$, is then a composite signal in which ground-wave noise has been significantly attenuated, but in which the desired seismic signal has not been significantly attenuated.

The coefficients of the two-channel filter employed in the method of our invention may be designed using different approaches from those given above. Somewhat different values will of course result, the the concept is essentially the same and the benefits of our invention will likewise accrue with these techniques.

One of these alternative techniques involves computations in the frequency domain. For this technique we let $H_1(f)$ and $H_2(f)$ be represented by the following:

$H_1(f) = (1/\sqrt{2})\epsilon^{-j45°}$ for $0 \leq f \leq f_o =$
$(1/\sqrt{2})\epsilon^{+j45°}$ for $-f_o \leq f < 0 = 0$ for $|f| < f_o$ 8.

$H_2(f) = (1/\sqrt{2})\epsilon^{+j45°}$ for $0 \leq f \leq f_o =$
$(1/\sqrt{2})\epsilon^{-j45°}$ for $-f_o \leq f < 0 = 0$ for $|f| > f_o$ 9.

The term $[H_1(f) + H_2(f)\epsilon^{+j\theta}]$ in equation (5) will then be equal to 1 for $\theta_d = 0$, and will be equal to 0 for $\theta_d = 90°$, when $0 \leq f \leq f_o$. The corresponding time functions for $H_1(f)$ and $H_2(f)$ in equations (8) and (9) are given by the following:

$h_1(t) = F^{-1}[H_1(f)] = 1/\sqrt{2} \pi t [\sin \pi/4 + \sin (2\pi f_o t - \pi/4)]$ 10.

$h_2(t) = F^{-1}[H_2(f)] = 1/\sqrt{2} \pi t [-\sin \pi/4 + \sin (2\pi f_o t + \pi/4)]$ 11.

Here $h_1(t)$ and $h_2(t)$ may be sampled and multiplied by a smoothing function, such as a "Hanning" function. The expressions for the coefficients obtained by using a "Hanning" function, which results in 2N+1 filter coefficients, are given by the following equations:

$h_1'(nT) = T \cdot h_1(nT) \cdot ½(1 + \cos \pi n/N)$ for $|n| \leq N$
$= 0$ for $|n| > N$ 12.
$h_2'(nT) = T \cdot h_2(nT) \cdot ½(1 + \cos \pi n/N)$ for $|n| \leq N$
$= 0$ for $|n| > N$ 13.

The frequency $f_o$ should be some value less than or equal to the Nyquist frequency which includes the seismic band of interest.

It will be noted from the foregoing that, in the time domain, filter channel number 1 is convolved with the vertical signal and filter channel number 2 is convolved with the horizontal signal. The two filter outputs are then summed to give the desired output, as illustrated in FIG. 6. The filtering process may also be accomplished in the frequency domain using the transfer functions given in equations (8) and (9). This is done by taking the Fourier transform of the vertical signal and multiplying it by $H_1(f)$, and taking the Fourier transform of the horizontal signal and multiplying it by $H_2(f)$; the results are then summed as indicated in equation (1). The inverse Fourier transform of the output $Y(f)$ may then be taken, resulting in the desired output trace.

A filter designed by the first of the above-mentioned techniques, i.e., linear programming, has been successfully employed. Surface noise was severely attenuated, by approximately 20 db. It should be remembered that the attenuation produced by our invention is not due to frequency filtering, viz., employing a band pass filter to remove frequencies outside the seismic band of interest, but rather is strictly due to phase differences between frequency components in the vertical and horizontal signals.

It should be further noted that, in lieu of a single horizontally oriented geophone and a single vertically oriented geophone, signals representative of $V_x(t)$ and $V_z(t)$ may be produced by arrays of horizontally oriented and vertically oriented geophones, as known in the art and described in the article by C. H. Sairh, J. T. Brustad, and J. Sider, entitled "The Moveout Filter," in *Geophysics*, vol. XXIII, no. 1, January 1958.

We claim:

1. In the method of seismic prospecting in which signals are separately but simultaneously received from a substantially vertical direction and a substantially horizontal direction and separately recorded as first and second signals representative of first and second functions of time, respectively, the improvement comprising:

a. passing said first signal through a first channel including a digital filter to produce a third signal representative of a third function of time;

b. passing said second signal through a second channel including a digital figure to produce a fourth signal representative of a fourth function of time; the coefficients of said digital filters being selected such that, with respect to each of a plurality of selected frequencies, the sum of said third and fourth signals is substantially zero when the first signal is 90° out of phase with the second signal and said sum is substantially equal to said first signal when the first signal is in phase with the second signal; and c. summing the third and fourth signals, thereby producing a fifth signal representative of a fifth function of time, in which ground-wave noise is significantly attenuated.

2. The method of claim 1 wherein:

a. the selected frequencies are spaced at equal intervals within a seismic band of interest; and at least twenty-one coefficients are employed in each digital filter channel.

3. The method of claim 2 wherein said first and second signals are digitized prior to said steps of passing through digital filter channels.

4. The method of claim 3, further comprising applying automatic gain control treatment to each of said first and second signals prior to said steps of passing said signals through digital filter channels.

* * * * *